United States Patent Office 3,180,649
Patented Apr. 27, 1965

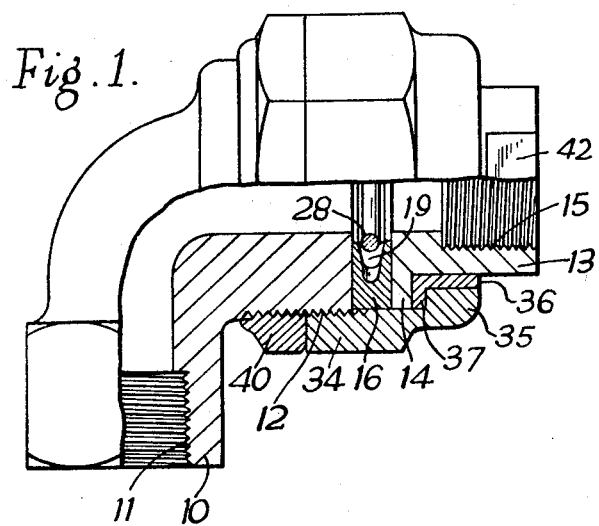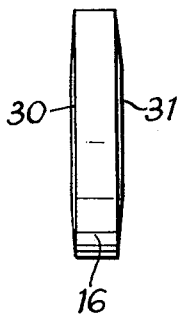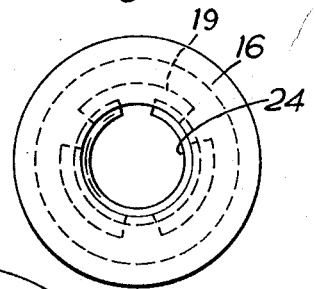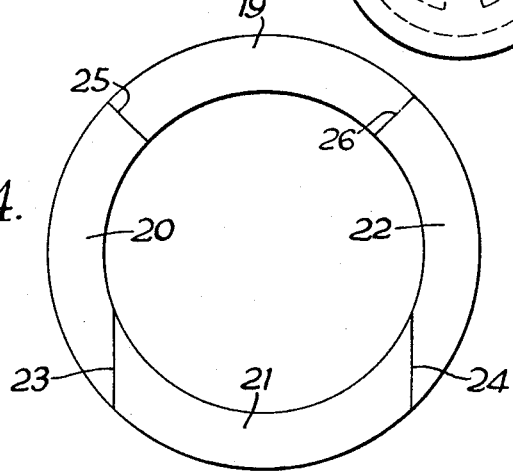

3,180,649
ROTARY PIPE COUPLINGS
John Trevor Nicholas Heygate, Windsor, England, assignor to J. R. H. Products & Company Limited, Windsor, England
Filed Nov. 21, 1961, Ser. No. 153,857
4 Claims. (Cl. 277—144)

This invention relates to packing rings and to pipe couplings utilising such rings and particularly although not solely to couplings of the kind in which the connected pipes are relatively rotated about their common axis during normal use, for example for steam piping in which a pipe conveying steam to the work is moved pivotally on its coupling for moving the free end of the pipe towards and away from the work.

According to the invention a packing ring comprises a ring of synthetic plastic material having an approximately U-shaped cross-section with the limbs of the U directed radially inwardly of the ring, spring means within the ring urging these limbs apart, and a plurality of arcuate shoes provided between the spring means and the inner periphery of the ring, said shoes being of wedge shaped cross-section with the thin end of the wedge shape at the outer peripheral edges of the shoes and seating in the limbs of the ring to force them apart.

Also according to the present invention a coupling comprises two pipe members having their bores in alignment and arranged for relative rotational movement between them, the first member having external threads to receive a screw-threaded ring which has an inturned flange to engage over an external flange on the second member, for drawing said members together, a packing being interposed between said members, said packing being constructed as above described.

A constructional form of the invention will now be described by way of example with reference to the accompanying drawings wherein:

FIGURE 1 is a view partly in elevation and partly in section of a pipe coupling and packing made in accordance with the invention;

FIGURE 2 is an elevational view of the packing;

FIGURE 3 is an axial elevation of the packing; and

FIGURE 4 is an axial elevation of shoes forming part of the packing.

A first member 10 is an elbow pipe having internal threads 11 at one end and external threads 12 at the other end. A second pipe member 13 has an external annular flange 14 at the end adjacent the first pipe and an internal thread 15 at its other end. The adjacent ends of the pipes have annular faces parallel to each other with a packing ring 16 between them, the outer radius of the packing ring being the same as that of the first pipe and flange of the second pipe. The packing ring 16 is made of a polyamide, polytetrafluorethylene or similar synthetic plastic material and has an approximately U-shape radial cross-section, the limbs of the U being directed inwardly and pressed apart against said faces by four part annular or sector shaped brass shoes, 19, 20, 21, 22 which are tapered in cross-section with their smaller ends seating in the U of the packing ring. A split circular spring 28 within the packing ring presses the shoes into the space between the limbs of the packing ring. These shoes form in effect a ring split on two lines 23, 24 that are parallel to each other and on two lines 25, 26 that are approximately radial of the ring. It is found that this arrangement helps to keep only small gaps between the shoes as these are pressed outwardly by the spring. The packing ring is of increasing size in the axial direction from its outer periphery inwards so as in effect to bulge at 30, 31. This helps to have the limbs of the ring tightly pressed toward each other by the pipe members.

A clamping ring 34 is provided having an internal screw thread at one end and an internal annular flange 35 at the other end. The screw-thread screws on to the external thread 12 on the first pipe member and the flange 35 engages behind the external flange 14 on the second pipe with the interposition of a bearing and thrust ring having a tubular portion 36 between the second pipe and the flange 35 and an annular flange portion 37 between said flange 35 and the external flange 14 on the clamping ring. This bearing and thrust ring is made of bronze and a synthetic plastics material, e.g. polyamide or polytetraflourethylene. The outer peripheral surface of the packing ring seats on the internal surface of the clamping ring.

An internally threaded locking ring 40 may be screwed on to the external threads 12 on the first pipe member and is screwed tightly against the clamping ring 34 to serve lock the latter in position.

The pressure of fluid in the pipes also urges the limbs of the U-shaped packing apart to maintain a good seal.

The coupling is particularly effective for permitting relative rotary movement between the pipes while maintaining a good seal in conditions of widely varying temperature.

The parts 10, 34, 40 are made of hexagonal shape and the part 13 is formed with flats 42 for engagement by a spanner.

The pipe 10 may be a straight pipe instead of an elbow pipe.

I claim:

1. A packing ring comprising a flat disc-shaped ring of synthetic plastic material having an approximately U-shaped cross-section with the limbs of the U directed radially inwardly of the ring, at least three arcuate shoes unconnected with each other provided at the inner periphery of the ring, said shoes being of wedge shaped cross-section with the thin end of the wedge shape at the outer peripheral edges of the shoes and seating in the limbs of the ring, and a round-section split spring ring urging the shoes radially outwardly into the limbs of the ring to force them apart.

2. A packing ring as claimed in claim 1 wherein the spring means is a split circular spring ring.

3. A packing ring as claimed in claim 1 wherein four shoes are provided forming a ring split on two adjacent lines that are parallel to each other and on two other lines that are approximately radial.

4. A packing ring as claimed in claim 1 wherein the ring is of increased dimensions axially towards its inner periphery.

References Cited by the Examiner
UNITED STATES PATENTS

| | | | |
|---|---|---|---|
| 1,436,392 | 11/22 | Gonz | 285—281 |
| 1,519,111 | 12/24 | Brownell | 285—98 X |
| 1,811,649 | 6/31 | Russell | 285—379 X |
| 2,434,484 | 6/48 | Chambers | 277—182 X |
| 2,454,036 | 11/48 | Wright | 277—181 X |
| 2,512,883 | 6/50 | Warren | 285—112 |
| 2,752,579 | 6/56 | Caldwell | 285—52 X |
| 2,794,658 | 6/57 | Parkhiser | 285—52 |
| 3,076,667 | 2/63 | Klingler | 277—181 X |

FOREIGN PATENTS 1,047,939  12/53  France.

CARL W. TOMLIN, Primary Examiner.